March 16, 1948. A. G. COOLEY 2,437,848
SUPPORT FOR ELECTROOPTICAL APPARATUS
Filed Dec. 30, 1944 4 Sheets-Sheet 1
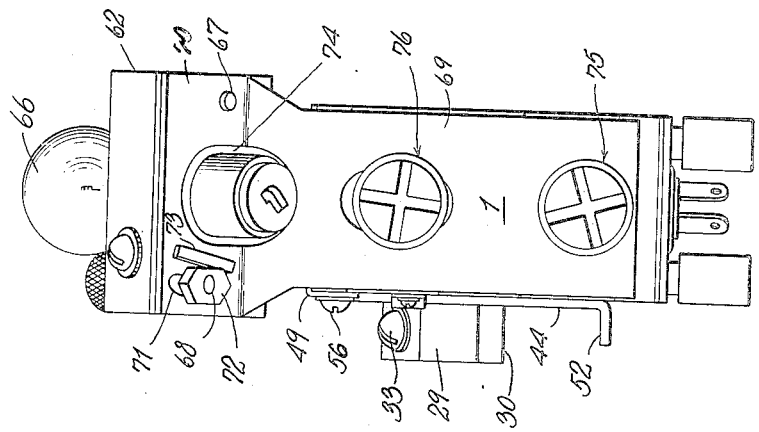
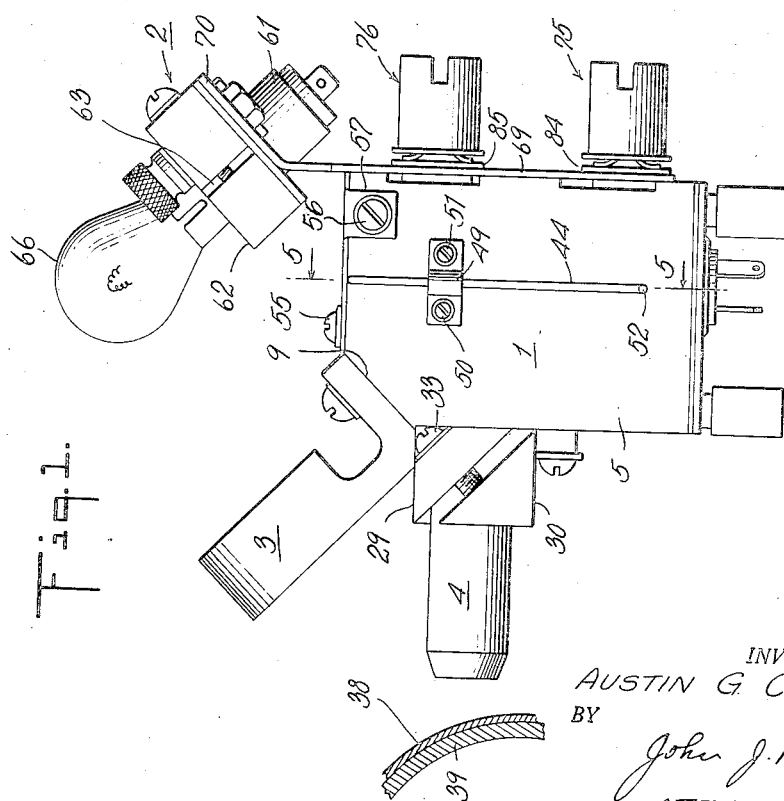
INVENTOR.
AUSTIN G. COOLEY
BY
John J. Rogan
ATTORNEY

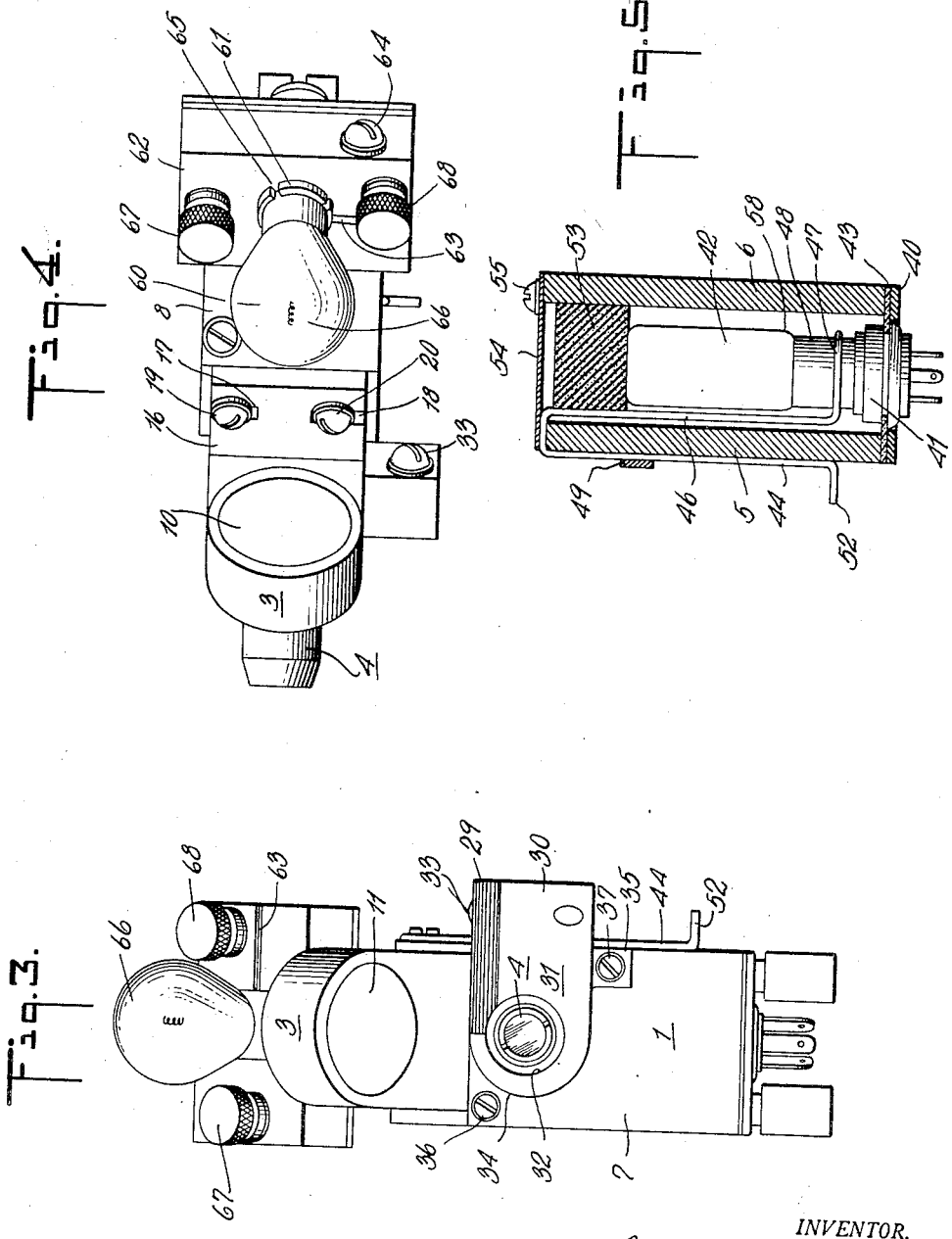

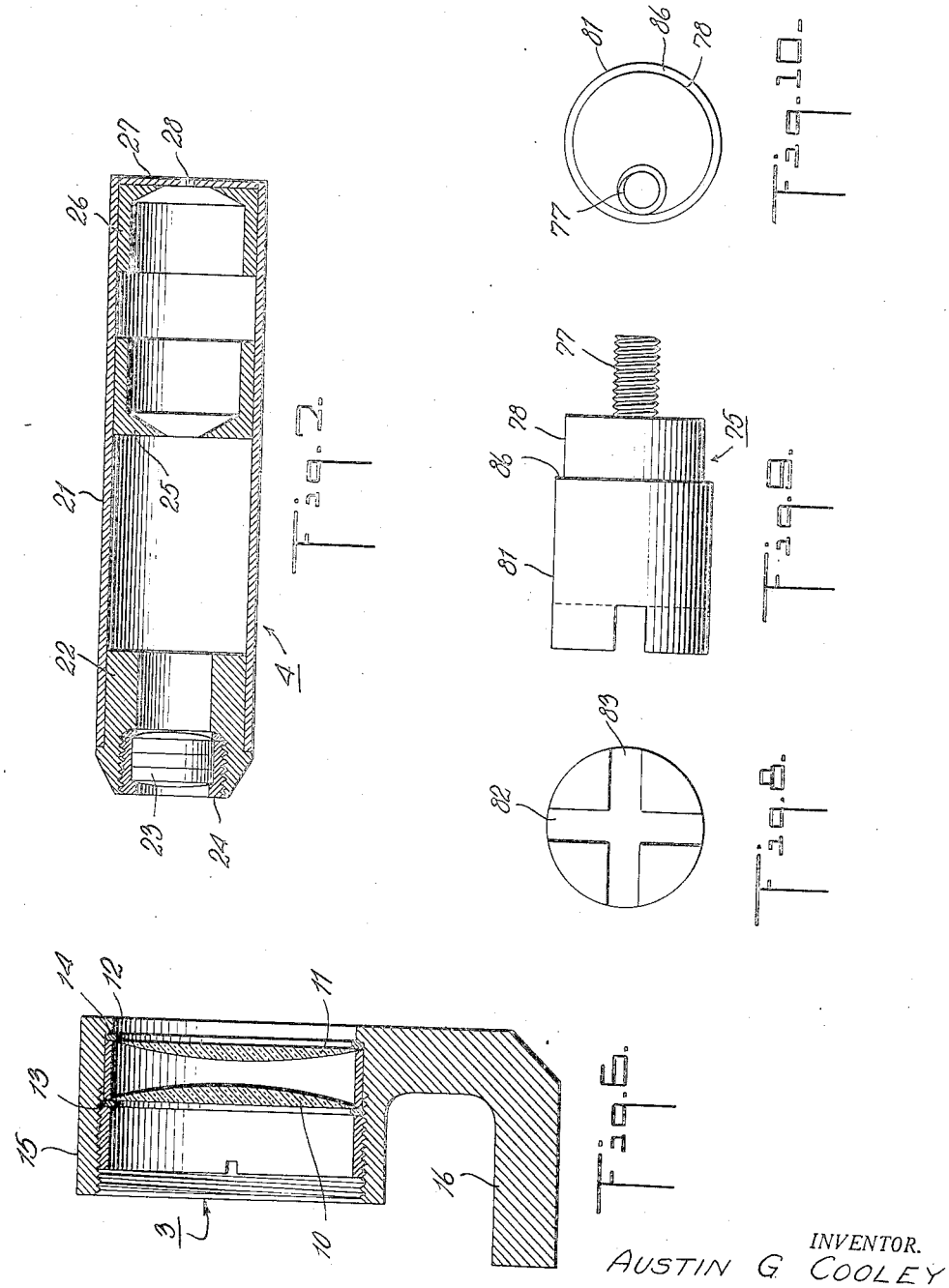

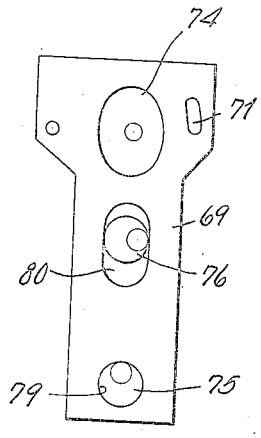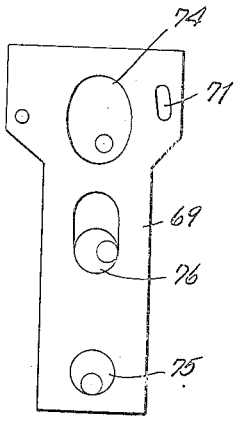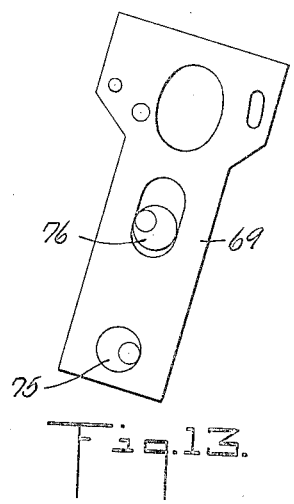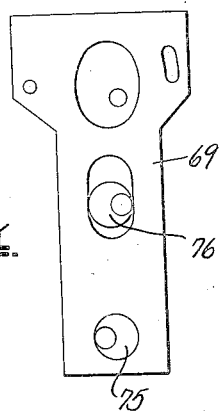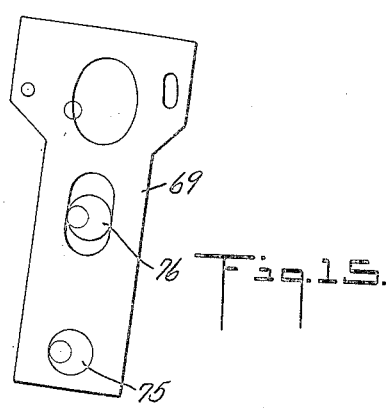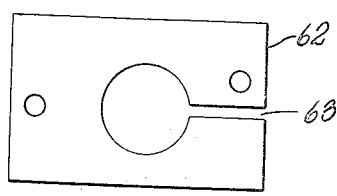

Patented Mar. 16, 1948

2,437,848

UNITED STATES PATENT OFFICE 2,437,848

SUPPORT FOR ELECTROOPTICAL APPARATUS

Austin G. Cooley, New York, N. Y., assignor to Times Facsimile Corporation, a corporation of New York Application December 30, 1944, Serial No. 570,602

3 Claims. (Cl. 248—295)

This invention relates to electro-optical apparatus and more especially to scanning heads for facsimile transmitters and the like.

A principal object is to provide an improved facsimile scanning head which is capable of easy and accurate adjustment with respect to the subject matter being scanned.

Another object is to provide a scanning head having a novel adjustable mounting for the light source with respect to the subject matter being scanned and with respect to the light responsive cell.

A feature of the invention relates to a novel eccentric-controlled mounting support for a scanning lamp whereby the lamp filament can be adjusted to the optimum effective position.

A further feature relates to an improved assembly unit comprising an optical system, light source and light-sensitive cell housing which can be easily and expeditiously mounted and adjusted.

A still further feature relates to the novel organization, arrangement and relative location of parts which cooperate to provide an improved scanning head for facsimile transmitters and the like.

In the drawing which shows one preferred form,

Fig. 1 is a side view of the improved scanning head according to the invention.

Fig. 2 is a right-hand end view of Fig. 1.

Fig. 3 is a left-hand end view of Fig. 1.

Fig. 4 is a top-plan view of Fig. 1.

Fig. 5 is a sectional view of Fig. 1 taken along the line 5—5 thereof, and viewed in the direction of the arrow.

Fig. 6 is a detailed sectional view of the condenser lens subassembly of Fig. 1.

Fig. 7 is a detailed sectional view of the objective lens barrel unit.

Fig. 8 is an end view of one of the eccentric lamp adjusting members.

Fig. 9 is a side view of Fig. 8.

Fig. 10 is a right-hand end view of Fig. 9.

Figs. 11 to 15 are diagrammatic views explanatory of the manner in which the eccentric adjustments are effected.

Fig. 16 is a plan view of the lamp mounting block.

In certain kinds of facsimile equipment, it is customary to use as the light source an incandescent filament lamp having a small concentrated filament. One of the serious problems in the use of such lamps is to bring the filament into accurate or optimum focus with respect to the subject matter being scanned. Furthermore, since the filament is not a true spot or planar light source, it is also necessary to adjust the lamp so as to obtain the optimum uniformity of spot illumination on the subject matter. The present invention provides readily adjustable means for accomplishing not only the focussing adjustment but also the optimum position of the lamp filament.

Referring to the drawing, the device comprises in general, four major units or subassemblies, namely the light cell and housing unit 1; the light source unit 2; the condenser lens unit 3; and the objective lens unit 4. The units 2, 3 and 4 are adjustably mounted on the housing unit 1. As shown in Fig. 5, the light cell housing comprises a metal box-like casting having solid side walls 5, 6, and front and rear walls 7 and 8. The housing also has an inclined front wall section 9 on which is adjustably fastened the condenser lens unit 3. Unit 3 comprises a pair of condenser lenses 10, 11 (Fig. 6), which are spaced in fixed relation by a cylindrical sleeve 12 and suitable retainer rings 13 and 14. The lens unit 3 is fastened within the annular portion 15 of a metal casting which is integrally formed with a flat foot portion 16. Portion 16 is provided with two slots 17 and 18 through which pass the screws 19 and 20 for fastening unit 3 to the inclined part 9 of the housing. Thus the condenser lens unit can be adjusted laterally to either side of the central vertical axis of the housing and then fastened in place by screws 19, 20.

The front wall of the housing has a circular window into which is closely fitted the right-hand end (Fig. 7) of the objective lens barrel unit 4. This unit comprises a metal tube 21 into the left-hand end of which is fitted the internally threaded sleeve 22. The objective lens 23 is held in place by an externally threaded ring 24. Suitable apertured light stops 25 and 26 are fastened within tube 21 and the right-hand end of the tube is closed by a plate 27 having a small central aperture 28. The lens barrel of Fig. 7 is rigidly clamped between the spaced arms 29, 30, of a diagonally split casting 31, which has a circular bore 32 to receive barrel 21. A tightening screw 33 clamps the arms 29 and 30 together thus rigidly holding the barrel in place. The casting 31 also has two lugs 34, 35, to receive screws 36, 37, by means of which the lens barrel unit 4 is rigidly fastened to the front wall 7 of the housing. Thus by loosening screw 33, the barrel can be adjusted longitudinally with respect to the surface 38 to be scanned. This surface is shown diagrammatically in Fig. 1 and may comprise a sheet or strip containing the subject matter to be transmitted which sheet or strip is supported on a rotating scanning drum 39. The drum may be subjected to a feeding movement and to a rotary movement in order to bring each successive elemental area of the subject matter in registry with the scanning head. For a detailed description of a suitable scanning drum and operating mechanism therefor, reference may be had to U. S. Patent No. 2,138,784, granted November 29, 1938.

The bottom of housing 1 is closed by a metal plate 40 in which is rigidly anchored a suitable receptacle or socket 41 into which may be plugged any well-known form of photo-electric cell 42. A suitable moisture-proof gasket 43 is interposed between the plate 40 and the bottom of the housing. In order to facilitate removal of the cell, there is provided an inverted U-shaped wire member 44, one arm of which extends downwardly along the outside wall 5, and the other arm 46 of which extends downwardly within the housing. The arm 46 has its end 47 bent at right angles and to circular shape so as to embrace the base 48 of the cell. The exterior arm 44 extends down through a guide 49 which is fastened to wall 5 by screws 50, 51. The lower end of arm 44 has a right-angled portion 52 for manipulating the cell. A packing 53 (Fig. 5) of felt, sponge rubber or the like is inserted into the top of the housing and abuts against the upper end of cell 42. A metal cover plate 54 closes off the top of the housing and is held in place by screws 55, 56, the latter screw cooperating with a right-angled downwardly extending lug 57 on plate 54.

When it is desired to remove the cell, screws 50 and 51 are loosened and the arm 44 is raised by pressing upwardly on lug 52, thus causing the portion 47 to abut against the shoulder 58 on cell 42 and thereby withdrawing the cell from its socket 41. When the cell is raised sufficiently out of the housing, it may be readily grasped and entirely removed therefrom.

The lamp unit 2 comprises a suitable concentrated filament incandescent lamp 66 which is adapted to be plugged into a lamp socket 61. Socket 61 is fitted within a circular opening in an insulation block 62 which is split at 63 and a tightening screw 64 passes through the split portions to clamp them together. The socket 61 is preferably of the bayonet type having one or more slots 65 in its cylindrical side wall to receive the usual bayonet pins on the lamp base. However, by loosening screw 64, the socket 61 can be turned through any desired angle to adjust the position of the lamp filament 66 to the optimum position. In order to simplify this adjustment, the cylindrical wall of the socket 61 has a set of four slits which extend above the block 62 so that by inserting a screw driver or other simple flat tool through the diametrically opposite slots, the base can be turned to the desired angle whereupon the screw 64 can be tightened.

Passing through the insulation block are two thumb screws 67, 68. The block 62 is adapted to be fastened to the adjusting plate 69 which has its upper end 70 bent at an angle so that it is substantially parallel to the wall portion 9 when the plate 69 is in the position shown in the drawing. The portion 70 extends above the housing 1 so as to provide sufficient clearance for the lamp socket 61. The thumb screw 67 is threaded into a corresponding threaded opening in the portion 70 while the screw 68 passes through a slot 71 (Figs. 2 and 11 to 15). By this method of attachment, the block 62 can be pivoted around screw 67, thus providing a fine adjustment of the position of the lamp with respect to the optical system. The screw 68 is locked in place by nut 72 which cooperates with a ridge 73 on the undersurface of portion 70. In order to allow for movement of the lamp and lamp base when the block 62 is turned around screw 67, the member 70 has an enlarged window or slot 74.

To provide further accurate adjustments for the position of the lamp filament with respect to the optical system, the plate 69 is slidably mounted on two separate eccentric adjustment members 75, 76. One of these members is shown in an enlarged detail in Figs. 8, 9 and 10. Each comprises a threaded portion 77 which is threaded into the end wall of the housing 1. The threaded portions 77 are eccentric with respect to the circular shouldered portions 78, each of which is adapted to engage the sides of the corresponding slots 79, 80. Each of the eccentric adjusting members has an enlarged slotted head 81, provided with right-angled slots 82, 83, so that the eccentric members may be adjusted by an ordinary screw driver or similar simple flat-ended tool.

Referring to Figs. 11 to 15, it will be noted that the slot 79 which cooperates with the eccentric member 75 is circular so that when the head 81 is turned it causes the plate 69 to be subjected mainly to a raising and lowering determined by the eccentric throw of the member 75. Thus, by turning member 75, the lamp may be raised and lowered with respect to the housing 1. On the other hand, the slot 80 is elongated so that when the member 76 is turned it causes a turning motion of the plate 69 around the member 75 as a pivot. By this combination of separate eccentrics and corresponding circular and elongated slots, it is possible to adjust the plate 69 to any desired vertical or horizontal position, some of which are shown respectively in Figs. 11 to 15 of the drawing. If only one eccentric adjustment, for example member 75, were provided, the adjusting motion of the plate 69 could not be confined to a straight-line sliding adjustment should that be necessary. However, by providing the additional eccentric adjusting member 76, it is possible to compensate for any non-linear sliding motion of the plate 69 by appropriate adjustment of the said member 76. Thus, in using this adjustment arrangement, the member 75 may be turned to raise or lower the plate 69 the desired amount. During this adjustment, the plate is necessarily subjected to some pivoting motion around the member 76. In order to compensate or neutralize this pivoting motion so as to confine the adjustment to a simple straight-line motion, the member 76 may thereupon be turned so as to move the plate 69 back to its desired straight-line position. In order to retain the members 75 and 76 in their adjusted position preferably split ring locking washers 84, 85, are interposed between the shouldered portions 86 of each eccentric member and the face of plate 69. These spring washers are designed so as to have sufficient spring pressure to insure that the members 69, 75 and 76 do not change their adjusted positions even under abnormal shocks or jars to which the device may be subjected in use.

By the foregoing adjustment means, it is possible expeditiously and accurately not only to adjust the focus of the lens systems but also to adjust the position of the lamp filament to its optimum relation with respect to the lens systems.

Various changes and modifications may be made in the disclosed embodiment without departing from the spirit and scope of the invention.

What is claimed is:

1. An electro-optical unit comprising a lens system, a lamp, means to support said lamp in optical alignment with said lens system, a pair of eccentric pivots for said lamp support means, said pivots being rotatable independently of each other and thereby to adjust said lamp support means in mutually perpendicular and coplanar directions.

2. An electro-optical unit comprising a lens system, a lamp, means to support said lamp in optical alignment with said lens system, said means including a single member mounted for sliding motion in mutually perpendicular and coplanar directions, said single member having a pair of openings through which pass respective eccentric adjusting devices for controlling said sliding motion.

3. An adjusting device for electro-optical devices comprising a fixed support, a single movable support mounted for sliding movement in mutually perpendicular and coplanar directions on said fixed support, a pair of eccentric studs rotatably mounted in said fixed support and passing respectively through corresponding openings in said single movable support to engage the edges of said openings.

AUSTIN G. COOLEY.

REFERENCES CITED

The following references are of record in the file of this patent:

UNITED STATES PATENTS

| Number | Name | Date |
| --- | --- | --- |
| 1,716,529 | McCarthy | June 11, 1929 |
| 1,828,000 | Ranger | Oct. 20, 1931 |
| 2,136,789 | Finch | Nov. 15, 1938 |